US011196482B2

(12) United States Patent
Okino et al.

(10) Patent No.: US 11,196,482 B2
(45) Date of Patent: Dec. 7, 2021

(54) MONITORING DEVICE AND MONITORING METHOD

(71) Applicant: Nippon Telegraph and Telephone Corporation, Tokyo (JP)

(72) Inventors: Osamu Okino, Tokyo (JP); Hiroyuki Oyanagi, Tokyo (JP); Yuichiro Ishizuka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/978,259

(22) PCT Filed: Mar. 6, 2019

(86) PCT No.: PCT/JP2019/008889
§ 371 (c)(1),
(2) Date: Sep. 4, 2020

(87) PCT Pub. No.: WO2019/172319
PCT Pub. Date: Sep. 12, 2019

(65) Prior Publication Data
US 2020/0412445 A1 Dec. 31, 2020

(30) Foreign Application Priority Data
Mar. 8, 2018 (JP) .............................. JP2018-042103

(51) Int. Cl.
*H04B 10/077* (2013.01)
*H04Q 11/00* (2006.01)
(52) U.S. Cl.
CPC ..... *H04B 10/0775* (2013.01); *H04B 10/0773* (2013.01); *H04Q 11/0062* (2013.01); *H04Q 2011/0083* (2013.01)
(58) Field of Classification Search
CPC ... H04B 10/075; H04B 10/775; H04B 10/795
See application file for complete search history.

(56) References Cited

U.S. PATENT DOCUMENTS

2019/0245620 A1* 8/2019 Rafique .................. G06N 20/00
2019/0251093 A1* 8/2019 Bao ......................... G06F 16/00

FOREIGN PATENT DOCUMENTS

JP 3257772 12/2001
JP 2011-109489 6/2011

OTHER PUBLICATIONS

Ishizuka et al., "A proposal of alarm correlation for networks with multivendor optical paths by operation support systems," 2017 IEICE Communication Society Conference Proceedings, B-10-54, Sep. 12, 2017, p. 170, 3 pages (with English Translation).

(Continued)

*Primary Examiner* — Shi K Li
(74) *Attorney, Agent, or Firm* — Fish & Richardson P.C.

(57) ABSTRACT

To appropriately monitor a transmission device in an optical transmission system. A monitoring apparatus 1 monitors a plurality of transmission devices 2 having different specifications. The monitoring apparatus 1 includes a monitoring unit 11 that monitors whether a failure occurrence or failure recovery is present in the plurality of transmission devices 2, an analyzing unit 12 that determines whether the failure occurrence or the failure recovery continues for a predetermined period, in a case where the failure occurrence or the failure recovery is present in the plurality of transmission devices 2, a control unit 13 that identifies a cause of the failure, using a plurality of pieces of warning information received from the plurality of transmission devices 2 only in a case where the failure occurrence continues for the predetermined period, and a notifying unit 14 that notifies a higher-level monitoring apparatus of warning information corresponding to the cause of the failure.

9 Claims, 15 Drawing Sheets

(56) References Cited

OTHER PUBLICATIONS

Ohyanagi et al., "Alarm Management for Optical Transportation Elements in Disaggregated Architecture," Proceedings of the 2018 IEICE General Conference, B-6-19, Mar. 6, 2018, p. 19, 3 pages (with English Translation).

* cited by examiner

MONITORING DEVICE AND MONITORING METHOD

CROSS-REFERENCE TO RELATED APPLICATIONS

This application is a National Stage application under 35 U.S.C. § 371 of International Application No. PCT/JP2019/008889, having an International Filing Date of Mar. 6, 2019, which claims priority to Japanese Application Serial No. 2018-042103, filed on Mar. 8, 2018. The disclosure of the prior application is considered part of the disclosure of this application, and is incorporated in its entirety into this application

TECHNICAL FIELD

The present disclosure relates to a technology for monitoring a transmission device.

BACKGROUND ART

FIG. 9 is a diagram illustrating a known configuration of an optical transport network. The known optical transport network (OTN) includes an aggregation type network connection configuration in which a monitoring apparatus 1 (EMS; Element Management System) and a plurality of transmission devices 2 (NE; Network Element) are aggregated for each vendor.

In a case where a failure occurs in a data communication path of the optical transport network, or a failure occurs in the transmission device, the transmission device 2 issues warning information to the higher-level monitoring apparatus 1. The monitoring apparatus 1 identifies (arranges) the details of the failure and the place of the failure, based on the warning information from the transmission device 2, and notifies a higher-level integrated monitoring apparatus 3 (OpS; Operation System) of warning information including the details of the failure and the like. The integrated monitoring apparatus 3 manages the details of the failure and the place of the failure, based on the warning notification from the monitoring apparatus 1, and displays the details of the failure and the place of the failure, on a screen.

In the optical transport network, if a failure is detected in an upstream transmission device 2, all transmission devices 2 located downstream issue warning information to each of the monitoring apparatus 1 respectively. Thus, a large amount of warning information due to the spread of the failures will be issued. The transmission device 2 has a function of masking unnecessary warning information in order to prevent issuance of a large amount of warning information due to the failure spread.

For example, as illustrated in FIG. 10A, in a case where an optical transmission section (OTS) failure such as signal loss occurs in a predetermined section, an upstream transmission device 2a issues warning information to the monitoring apparatus 1 (not illustrated), and transmits a failure signal indicating that an error is detected downstream of the section, to a downstream transmission device 2b. In a case where the downstream transmission device 2b receives the failure signal, the downstream transmission device 2b does not notify the monitoring apparatus 1 (not illustrated) of the warning information even in a case where it is not possible to correctly receive a data signal as a transmission target. As illustrated in FIG. 10B, when a transmission device 2c issues warning information to the monitoring apparatus 1 (not illustrated) based on a failure in one transmission IF unit, the transmission device 2c does not perform notification of warning information regarding the above notification from another transmission IF unit.

That is, the known optical transport network is constructed for each vendor and in a case of the transmission device 2 of the same vendor, unnecessary warning information is effectively masked. Thus, the known monitoring apparatus 1 can easily perform processing of notifying the integrated monitoring apparatus 3 of warning based on warning from the transmission device 2.

In the current time, as illustrated in FIG. 11, a method is proposed in which a plurality of transmission devices 2 are separated and divided in units of functional blocks or the like, and the divided transmission devices 2 are constructed in a multi-vendor environment. Specifically, a disaggregation type network connection configuration is proposed in which the functions of the optical transport network are made independent and optimally re-divided, and are not aggregated for each vendor. For example, provisioning of an optical wavelength path by a disaggregation type Reconfigurable Optical Add/Drop Multiplexer (ROADM) is examined, and a wavelength switch (WSS; Wavelength Selective Switch), a fiber switch, and a transponder are configured using transmission devices 2 of different vendors, respectively.

CITATION LIST

Patent Literature

Patent Literature 1: JP 3257772 B

SUMMARY OF THE INVENTION

Technical Problem

However, the specifications of the transmission device 2 are different for each vendor, and thus, when a failure occurs in the data communication path or the transmission device 2, it is not possible to transmit a failure signal between transmission devices 2 and to mask unnecessary warning information in the transmission device 2. As a result, the unnecessary warning information is issued to the monitoring apparatus 1.

That is, in a case of a disaggregation type optical transport network including transmission devices 2 of different vendors, as illustrated in FIG. 12A, the downstream transmission device 2b does not recognize the failure signal from the upstream transmission device 2a. As a result, the monitoring apparatus 1 and the integrated monitoring apparatus 3 (not illustrated) are notified of a large amount of unnecessary warning information. In addition, as illustrated in FIG. 12B, a plurality of transmission IF units included in one transmission device 2c also function as transmission modules 2c1 and 2c2 of different vendors. Thus, the transmission IF unit in one device detect may not detect a failure in the transmission IF unit in another device, and the monitoring apparatus 1 and the integrated monitoring apparatus 3 are notified of the unnecessary warning information.

That is, as illustrated in FIG. 13, in an optical transport network having a disaggregation type network connection configuration, the specifications of a communication and monitoring interface in the transmission device 2 vary for each vendor. Thus, there is a problem in that the transmission device 2 cannot mask the warning information due to the failure spread.

For the above problems, it is considered that unnecessary warning information is masked on the monitoring apparatus 1 side. However, arranging warning information from the transmission device 2 by the monitoring apparatus 1 has the following problems.

Problem 1

Because the warning information of some of the transmission devices 2 may not be provided with a sequence number, as illustrated in FIG. 14A, the monitoring apparatus 1 cannot detect warning information for a UDP lost in a control communication path (DCN: Data Communication Network) between the transmission device 2 and the monitoring apparatus 1, and receives spread warning. Even in a case where the warning information is provided with the sequence number, as illustrated in FIG. 14B, if the monitoring apparatus 1 detects that the warning information is missing, the monitoring apparatus 1 performs processing of automatically reacquiring warning information having the missing sequence number. Thus, there may be a delay from the time when a failure occurs in the transmission device 2 to the time when the integrated monitoring apparatus 3 is notified of the warning.

Problem 2

Some of the transmission devices 2 do not issue warning information (recovery) when the transmission device 2 recovers from the failure. Thus, the monitoring apparatus 1 may not recognize an opportunity to notify the integrated monitoring apparatus of the warning information (recovery). Thus, the higher-level integrated monitoring apparatus 3 cannot determine whether the occurring warning can be deleted. For example, as illustrated in FIG. 15, in a case where a recovery notification is not performed for the cause warning, and a recovery notification is performed for spread warning, the monitoring apparatus 1 does not receive recovery information corresponding to the cause warning from the transmission device 2 (not illustrated) after the failure recovery. Thus, even if the recovery information corresponding to the spread warning is received, the integrated monitoring apparatus 3 may not be notified of the recovery information. As a result, the integrated monitoring apparatus 3 cannot delete the occurring warning.

Problem 3

In order to prevent fluttering, that is, an alarm intermittently generated and recovered, the transmission device 2 has a function of determining an alarm state using a warning occurrence protection time and a warning recovery protection time (hereinafter, warning protection time). The transmission device 2 issues warning information (occurrence) or warning information (recovery) to the monitoring apparatus 1 at a time point at which the transmission device 2 determines that the warning protection period has elapsed with or without an alarm generated after detection of the occurrence of the warning or the recovery. However, because some of the transmission devices 2 do not have the warning protection time, or the warning protection time varies depending on the transmission device 2, fluttering occurs, that is, warning information is separately received from each of the plurality of transmission devices 2 in the monitoring apparatus 1.

The present disclosure has been made in view of the above circumstances, and an object of the present disclosure is to appropriately monitor transmission devices.

Means for Solving the Problem

To solve the above problems, according to claim 1, a monitoring apparatus that monitors a plurality of transmission devices having different specifications includes a monitoring unit configured to monitor whether a failure occurrence or failure recovery is present in the plurality of transmission devices, an analyzing unit configured to determine whether the failure occurrence or the failure recovery continues for a predetermined period in a case where the failure occurrence or the failure recovery is present in the plurality of transmission devices, a control unit configured to identify a cause of the failure, using a plurality of pieces of warning information received from the plurality of transmission devices only in a case where the failure occurrence continues for the predetermined period, and a notifying unit configured to notify a higher-level monitoring apparatus of warning information corresponding to the cause of the failure.

According to claim 2, the monitoring apparatus according to claim 1 further includes a storage unit configured to store mask condition information for determining warning information of a downstream transmission device to be masked for warning information of an upstream transmission device. The control unit identifies the warning information to be masked, using the mask condition information.

According to claim 3, in the monitoring apparatus according to claim 1, the transmission device is configured by at least two transmission modules. The monitoring apparatus further includes a storage unit configured to store mask condition information for determining warning information of one transmission module to be masked for warning information of another transmission module. The control unit identifies the warning information to be masked, using the mask condition information.

According to claim 4, in the monitoring apparatus according to any one of claims 1 to 3, the monitoring unit sets only a cause of the failure as a monitoring target, and the notifying unit notifies the higher-level monitoring apparatus of recovery information in a case where failure recovery corresponding to the cause of the failure is received.

According to claim 5, a monitoring method for monitoring a plurality of transmission devices having different specifications by a monitoring apparatus includes, by the monitoring apparatus, monitoring whether a failure occurrence or failure recovery is present in the plurality of transmission devices, determining whether the failure occurrence or the failure recovery continues for a predetermined period in a case where the failure occurrence or the failure recovery is present in the plurality of transmission devices, identifying a cause of the failure, using a plurality of pieces of warning information received from the plurality of transmission devices only in a case where the failure occurrence continues for the predetermined period, and notifying a higher-level monitoring apparatus of warning information corresponding to the cause of the failure.

Effects of the Invention

According to the present disclosure, it is possible to appropriately monitor transmission devices.

DESCRIPTION OF EMBODIMENTS

Hereinafter, an embodiment of the present disclosure will be described with reference to the drawings.

Outline

Figure 1:
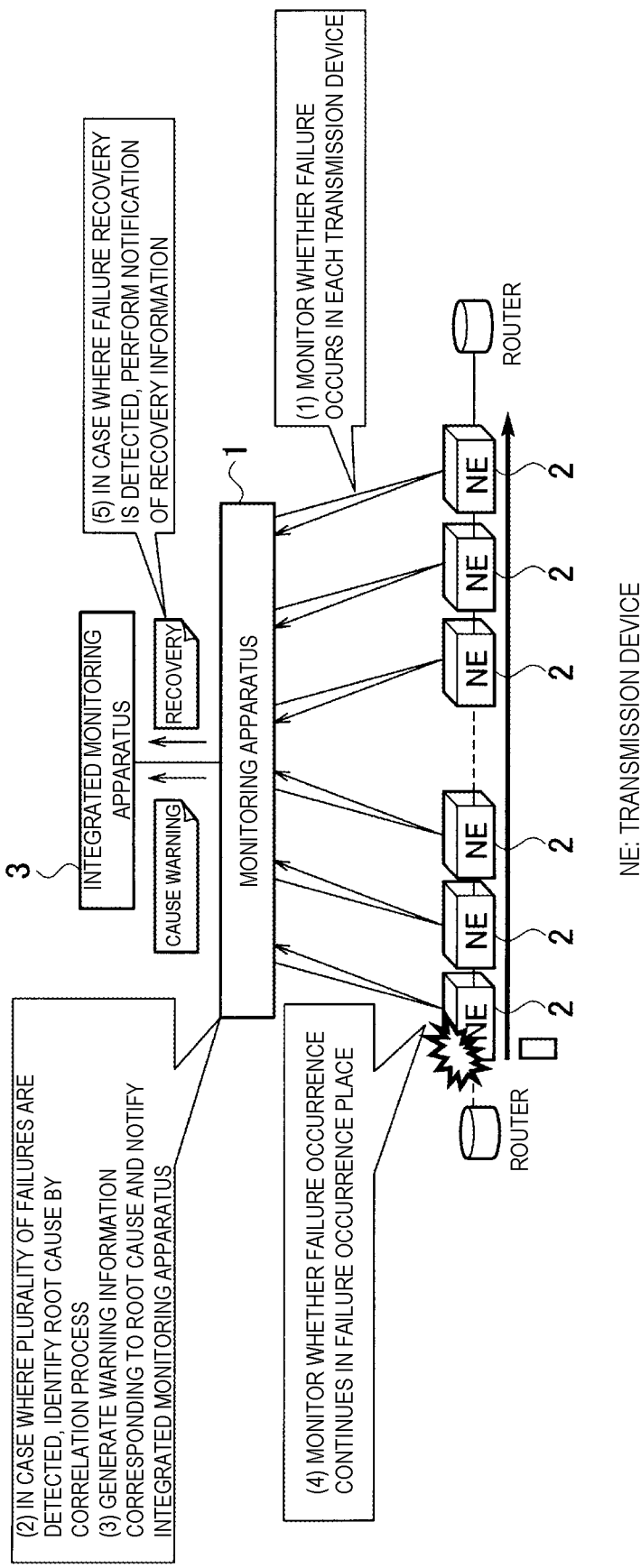
FIG. 1 is a diagram illustrating an outline of entire processing.

FIG. 1 is a diagram illustrating an outline of entire processing. An optical transmission system (optical transport network) includes a plurality of transmission devices 2 having different specifications, a monitoring apparatus 1 that monitors the plurality of transmission devices 2, and a higher-level integrated monitoring apparatus 3 that integrally monitors one or more monitoring apparatuses 1. The plurality of transmission devices 2 are constructed separately from a known optical transmission system, and have a disaggregation type network connection configuration in which the transmission devices are not aggregated for each vendor.

The monitoring apparatus 1 (Procedure 1) normally monitors whether a failure occurs and recovery is performed from the failure, in the plurality of transmission devices 2 using a technique such as telemetry, (Procedure 2), identifies a root cause by a correlation process in a case where failures occurring in the plurality of transmission devices 2 are detected, monitors fluttering for a period corresponding to the warning protection time when the root cause is evaluated, and sets only a transmission device, in which failure occurrence (failure recovery) continues, as an evaluation target, and (Procedure 3) generates warning information corresponding to the identified root cause and notifies the integrated monitoring apparatus 3 of the warning information.

Then, the monitoring apparatus 1 (Procedure 4) normally monitors whether the failure continuously occurs only for the identified root cause, and (Procedure 5) generates recovery information corresponding to the root cause in failure recovery and notifies the integrated monitoring apparatus 3 of the recovery information. The monitoring apparatus 1 performs nothing for the spread failure other than the root cause even if the monitoring apparatus detects the recovery.

Function of Monitoring Apparatus

Figure 2:
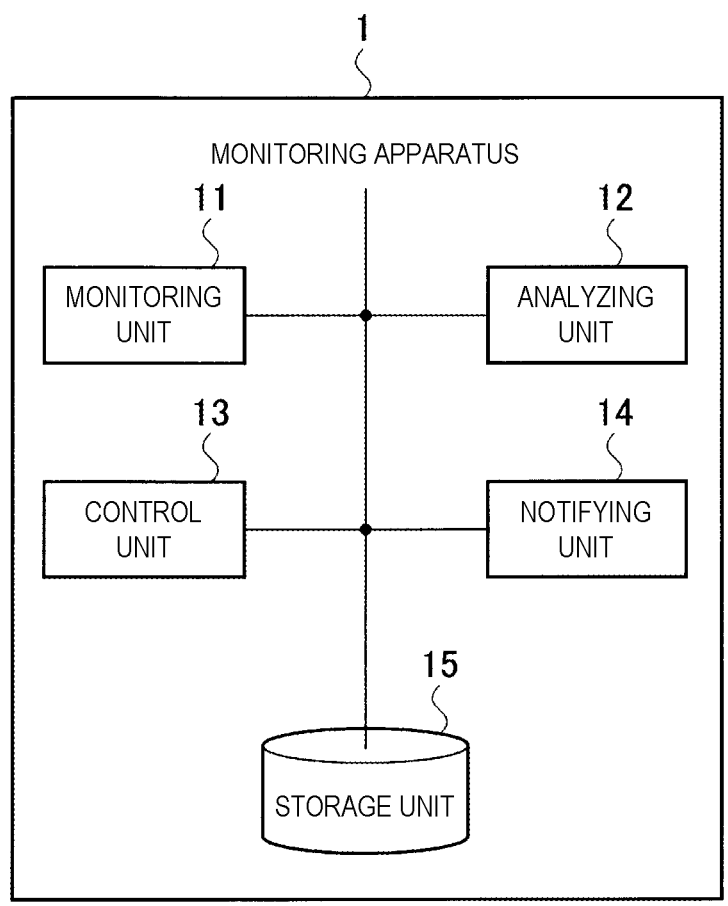
FIG. 2 is a diagram illustrating a functional block configuration of a monitoring apparatus 1.

FIG. 2 is a diagram illustrating a functional block configuration of the monitoring apparatus 1 according to this embodiment. The monitoring apparatus 1 includes a monitoring unit 11, an analyzing unit 12, a control unit 13, a notifying unit 14, and a storage unit 15.

The monitoring unit 11 has a function of monitoring whether a failure occurs or recovery is performed from the failure, in the plurality of transmission devices 2. The monitoring unit 11 has a function of setting only a cause of a failure, as a monitoring target.

The analyzing unit 12 has a function of determining whether the failure occurrence or the failure recovery continues for a predetermined period in a case where the failure occurs or recovery is performed from the failure in the plurality of transmission devices 2. The analyzing unit 12 has a function of setting only a cause of a failure, as a monitoring target and setting only the monitoring target as a determination target.

The control unit 13 has a function of identifying the cause of the failure, using a plurality of pieces of warning information received from the plurality of transmission devices 2 only in a case where the failure occurrence continues for a predetermined period.

The control unit 13 has a function of identifying warning information to be masked, using first mask condition information stored in the storage unit 15.

The control unit 13 has a function of identifying warning information to be masked, using second mask condition information stored in the storage unit 15 in a case where the transmission device 2 is configured by at least two transmission modules.

The notifying unit 14 has a function of notifying the integrated monitoring apparatus 3 of warning information corresponding to the cause of the failure. In addition, the notifying unit 14 has a function of notifying the integrated monitoring apparatus 3 of recovery information in a case where failure recovery corresponding to the cause of the failure is received.

The storage unit 15 has a function of storing the first mask condition information for determining warning information of a downstream transmission device 2 to be masked for warning information of an upstream transmission device 2. The storage unit 15 has a function of storing second mask condition information for determining warning information of one transmission module to be masked for warning information of another transmission module in a case where the transmission device 2 is configured by at least two transmission modules.

In addition, the storage unit 15 has a function of storing connection path configuration information of the plurality of transmission devices 2 in the optical transmission system. The storage unit 15 has a function of storing device configuration information of each of the plurality of transmission devices 2.

Operation of Monitoring Apparatus

Figure 3:
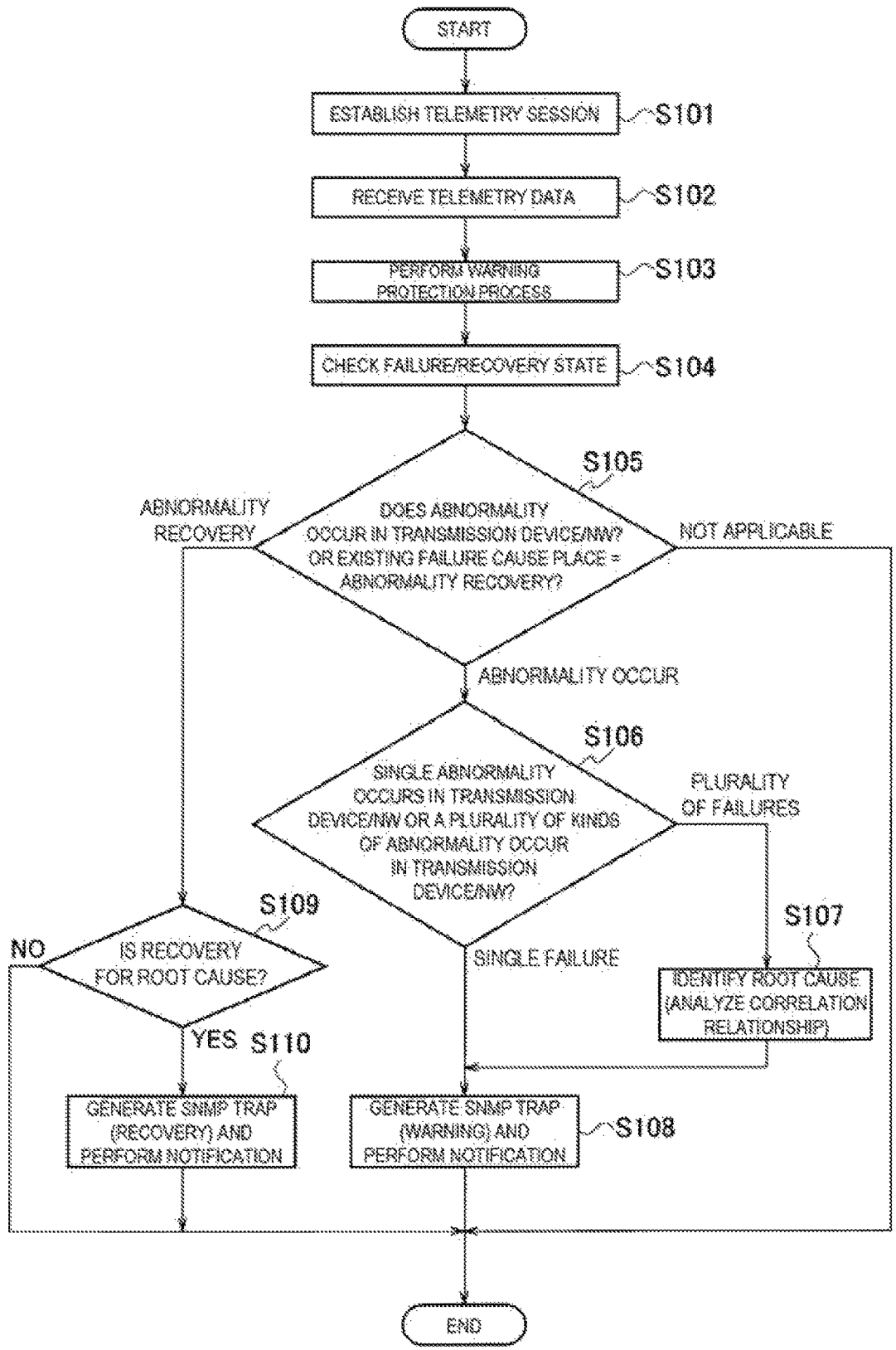
FIG. 3 is a flowchart illustrating processing of a monitoring method of a transmission device 2.

Next, a method of monitoring the transmission device 2, which is performed by the monitoring apparatus 1 will be described. FIG. 3 is a flowchart illustrating processing of a method of monitoring the transmission device 2, which is performed by the monitoring apparatus 1 according to the embodiment.

Step S101:

Firstly, the monitoring unit 11 establishes a telemetry session with each of the plurality of transmission devices 2 and monitors whether a failure occurs or recovery is performed from the failure in each of the plurality of transmission devices 2. Telemetry is a remote monitoring technology of performing various observations from a place remote from a monitoring target and acquiring the observed data. Step S101 corresponds to (Procedure 1) described above.

Step S102:

Then, in a case where a failure occurs in the transmission device 2, warning information is transmitted from the upstream transmission device 2 being the source of the failure, and warning information due to the spread of the failure is transmitted from the downstream transmission device 2. At this time, the monitoring unit 11 receives warning information (failure occurrence information) from the plurality of transmission devices 2 through the telemetry session, and stores the warning information in the storage unit 15. In a case where recovery is performed from the failure, the monitoring unit 11 receives warning information (failure recovery information).

Figure 4:
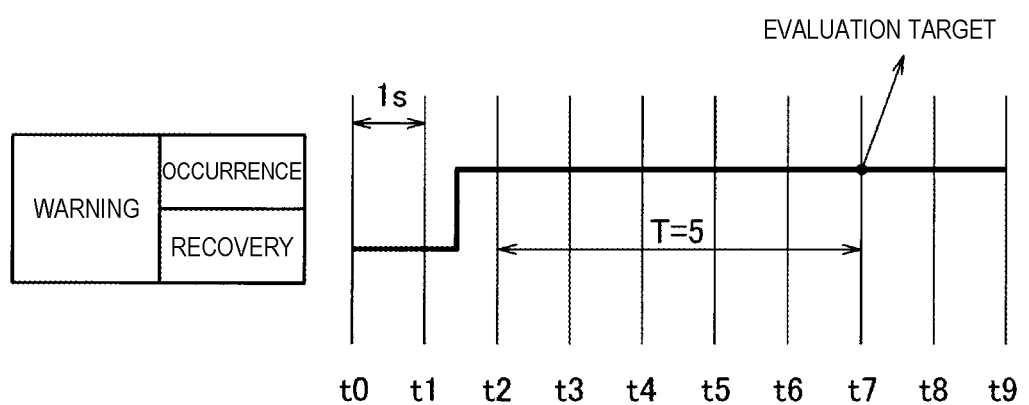
FIG. 4 is a diagram illustrating an example of a warning protection time.

Step S103:

Then, the analyzing unit 12 extracts a plurality of pieces of warning information stored in the storage unit 15 and checks whether warning information (failure occurrence information or failure recovery information) from the plurality of transmission devices 2 has been continuously received for a predetermined warning protection time. For example, as illustrated in FIG. 4, the analyzing unit 12 determines whether the warning information from the plurality of transmission devices 2 has been continuously received for 5 seconds (=warning occurrence protection time T), and sets the alarm information as an evaluation target of a root cause only in a case where the warning information is continuously received. The evaluation is performed in the subsequent steps. Step S103 corresponds to "monitors fluttering for a period corresponding to the warning protection time when the root cause is evaluated, and sets only a transmission device, in which failure occurrence (failure recovery) continues, as an evaluation target" in (Procedure 2).

Steps S104 and S105:

In a case where the warning information has been continuously received for a predetermined warning protection time, the control unit 13 checks information included in the warning information and determines whether a failure has occurred, recovery has been performed from the failure, or a situation other than the failure occurrence and the failure recovery has occurred. In a case where the failure occurs, the process proceeds to Step S106. In a case where recovery is performed from the failure, the process proceeds to Step S109. In a case where the situation other than the failure occurrence and the failure recovery has occurred, the process ends without proceeding to the subsequent steps. Even in a case where the warning information is not continuously received for the predetermined warning protection time, the process is also ended.

Step S106:

In a case where a failure has occurred, the control unit 13 determines whether the failure has occurred in one place or in a plurality of places. For example, in a case where the control unit receives the warning information from one transmission device 2, the control unit 13 determines that a failure has occurred in one place. In a case where the control unit receives the warning information from two or more transmission devices 2, the control unit 13 determines that the failure has occurred in the plurality of places.

Step S107:

In a case where the failure occurs in the plurality of places, the control unit 13 identifies the cause of the failure, using the plurality of pieces of warning information. Step S107 corresponds to "identifies a root cause by a correlation process in a case where failures occurring in the plurality of transmission devices 2 are detected" in (Procedure 2). A method of identifying the root cause will be described below.

In the embodiment, the root cause of the failure is identified using the correlation process of masking unnecessary warning information among a plurality of pieces of warning information.

First Correlation Process

A method disclosed in JP 2017-150731 (NTTH 295255) is used for the correlation process. For example, regarding the main signal interruption, "upstream warning information=warning AAA, downstream warning information=warning BBB" is held in first mask condition information. In a case where warning AAA (signal loss warning) is received from the upstream transmission device 2 (vendor A), and warning BBB (signal loss warning) due to failure spread is received from the downstream transmission device 2 (vendor B), the warning details of the warning AAA and the warning BBB are checked. Because both are for signal loss (main signal interruption), the warning BBB from the downstream transmission device 2 is determined to be unnecessary warning based on the first mask condition information and is masked. Both the warning AAA and the warning BBB mean the main signal interruption but warning title (Object Identifier (OID) in a case of SNMP) varies. In other words, in the correlation process in the patent application, a warning, which has the same meaning for each vendor, may have different titles or the OIDs. Thus, the meanings of the warning details are checked, and in a case where the meanings are identical or relevant, the downstream warning is masked.

In the patent application, the mask unit is set as a warning information unit, but data included in warning information may be set as the mask unit. Two methods of the correlation process in this case will be described below.

Second Correlation Process

Figure 5:
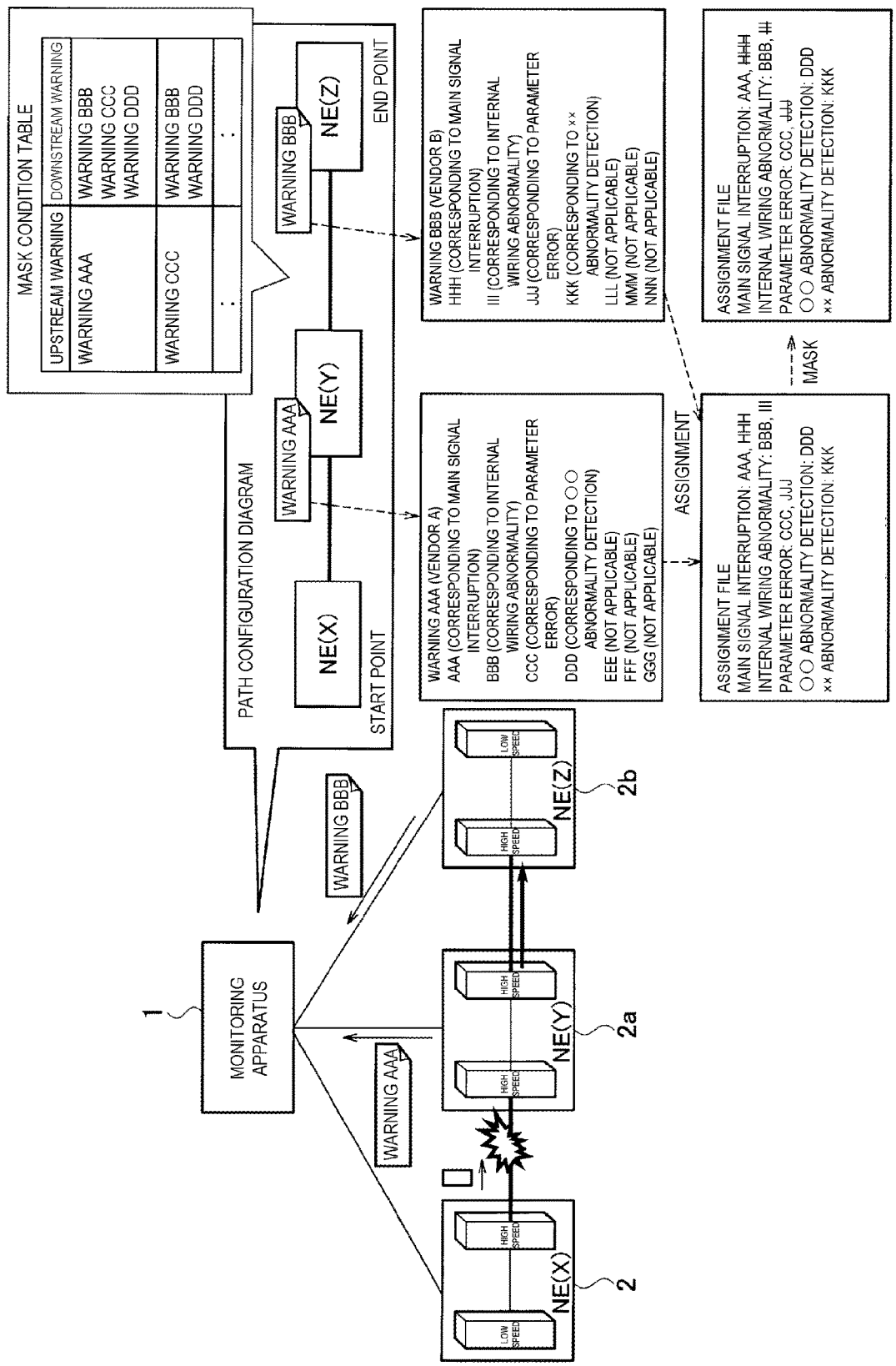
FIG. 5 is a diagram illustrating an operation image of a first correlation process.

FIG. 5 is a diagram illustrating an operation image of the first correlation process.

Firstly, in the monitoring apparatus 1, the control unit 13 reads a path configuration diagram describing a connection configuration of the plurality of transmission devices 2 from the storage unit 15, and maps the warning information received from each of the plurality of transmission devices 2 on each of the transmission devices 2 in the path configuration diagram. For example, warning AAA from an NE (Y) transmission device 2*a* of the vendor A is mapped onto an NE (Y) transmission device in the path configuration diagram. Similarly, the warning BBB from the NE (Z) transmission device 2*b* of the vendor B is mapped onto the NE (Z) transmission device in the path configuration diagram. At this time, the control unit 13 can recognize a vertical relationship of the upstream and the downstream of the plurality of pieces of mapped warning information, from the path connection configuration in the path configuration diagram.

Then, the control unit 13 assigns the warning information received from each of the plurality of transmission devices 2 to an assignment file having a common data format. For example, various kinds of data included in the warning AAA and various kinds of data included in the warning BBB are assigned to each of data items in an assignment file respectively. More specifically, for example, a signal corresponding to the main signal interruption included in each of the warning AAA and the warning BBB is input to an item of the main signal interruption in the assignment file. Thus, the control unit 13 can arrange the plurality of pieces of warning information received from the plurality of transmission devices 2 into each data item in one assignment file.

Then, the control unit 13 reads the first mask condition information from the storage unit 15, and identifies, as warning information to be masked, downstream warning information among the pieces of the warning information corresponding to the plurality of pieces of warning information having a vertical relationship. The control unit 13 masks the identified downstream warning information in the assignment file. For example, because the warning BBB corresponds to downstream of the warning AAA, various kinds of data of the warning BBB is masked in the assignment file. The "mask" refers to, for example, deleting the data or covering the data so that a monitoring user of the monitoring apparatus 1 or the integrated monitoring apparatus 3 cannot visually recognize the data without deleting it. As a result, the warning information due to the failure spread is removed from the assignment file, and only the warning information from the upstream transmission device 2 remains basically.

Then, the control unit 13 identifies the data remaining in the assignment file, as the root cause of the failure, and stores information of the root cause in the storage unit 15.

Third Correlation Process

Figure 6:
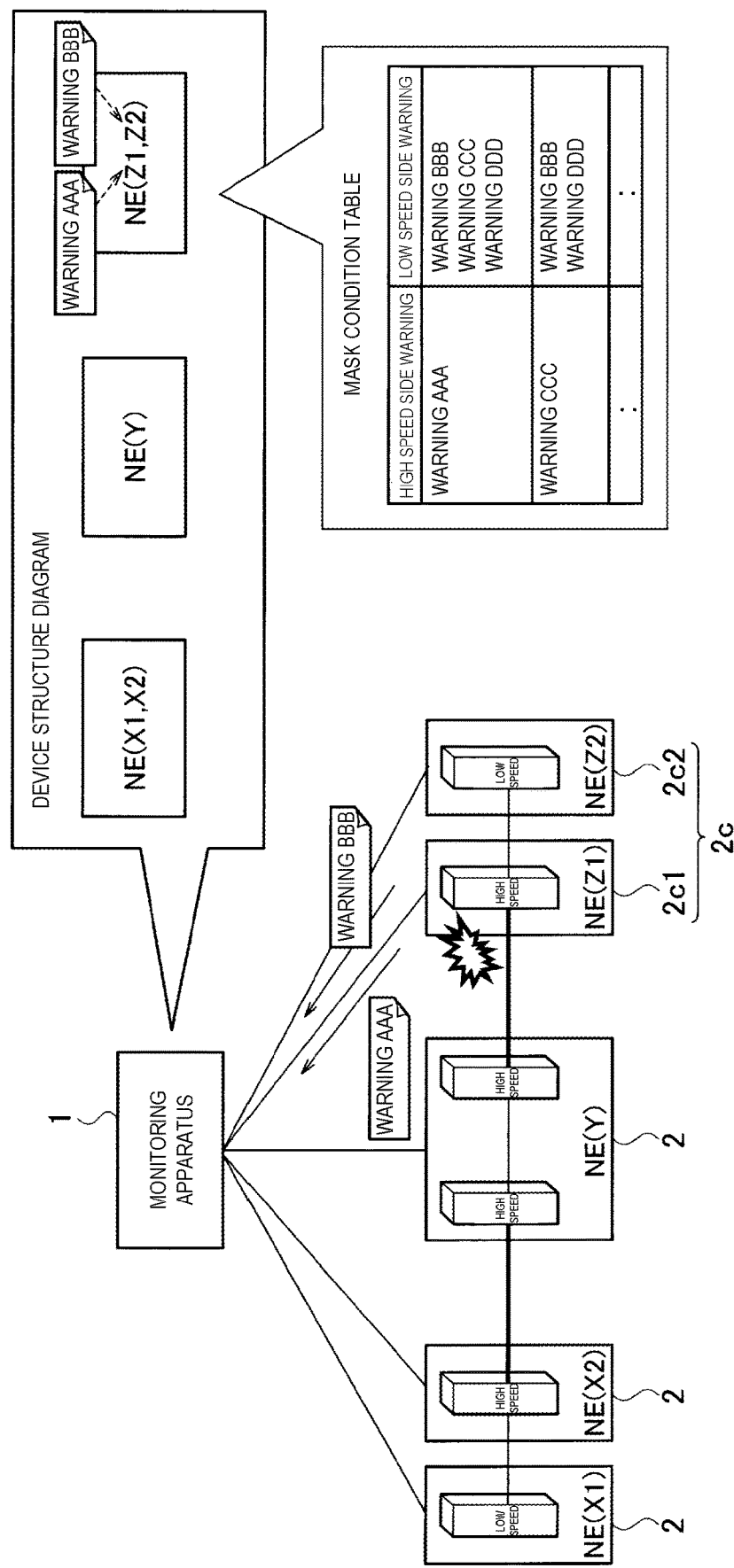
FIG. 6 is a diagram illustrating an operation image of a second correlation process.

Next, a case where one transmission device 2 is configured by two transmission modules having different communication speeds will be described. For example, as illustrated in FIG. 6, it is assumed that a transmission device 2c includes a high-speed transmission module 2c1 of a vendor A, which is connected to a backbone side of an optical transport network, and a low-speed transmission module 2c2 of a vendor B, which is connected to a user side. Also in this case, a process is performed in a manner similar to the first correlation process.

Firstly, in a case where the warning information is received from the high-speed transmission module 2c1 and the low-speed transmission module 2c2, the control unit 13 reads a device configuration diagram from the storage unit 15 and performs mapping onto the transmission device of the transmission device 2c. Then, the control unit 13 recognizes the vertical relationship of the plurality of pieces of mapped warning information, from the path connection configuration in the path configuration diagram. Then, the control unit 13 assigns each of the plurality of pieces of warning information to the assignment file, identifies downstream warning information using the second mask condition information, and masks the warning information in the assignment file. Thus, the warning information due to the failure spread is removed from the assignment file, and only the warning information from the upstream high-speed transmission module 2c1 remains basically. Then, the control unit 13 identifies the data remaining in the assignment file, as the root cause of the failure, and stores the information of the root cause in the storage unit 15.

After performing the correlation process, the control unit 13 notifies the analyzing unit 12 that only the identified root cause is set to be a monitoring target and a determination target. Thereafter, the analyzing unit 12 sets only the root cause as the monitoring target and the determination target.

Step S108:

After Step S107, the notifying unit 14 extracts the information of the root cause from the storage unit 15, generates warning information (SNMPTRAP) corresponding to the root cause, and notifies the integrated monitoring apparatus 3. In a case where it is determined in Step S106 that a failure has occurred in one place, the notifying unit 14 generates warning information (SNMPTRAP) corresponding to the failure in the one place, and notifies the integrated monitoring apparatus 3 of the warning information. Step S108 corresponds to (Procedure 3). Then, the process is ended.

Step S109:

In a case where it is detected in Step S105 that the warning information is failure recovery information, the analyzing unit 12 determines whether the failure recovery information is failure recovery corresponding to the root cause of the monitoring target identified in Step S107.

Step S110:

In a case where the failure recovery information is the failure recovery corresponding to the root cause, the notifying unit 14 generates recovery information (SNMPTRAP) corresponding to the warning information notified in Step S108, based on the failure recovery information, and notifies the integrated monitoring apparatus 3 of the recovery information. In a case where the failure recovery information is not the recovery information corresponding to the root cause, the process is ended.

Hitherto, the method of monitoring the transmission device 2 performed by the monitoring apparatus 1 has been described. The monitoring apparatus 1 may perform Steps S102 to S110 regularly or irregularly. In a case where the steps are performed regularly, the monitoring apparatus 1 may perform polling of an access monitoring processing for the transmission device 2 at short intervals.

Overall Operation of Optical Transmission System

Next, an overall operation performed in the optical transmission system will be described. Here, the failure occurrence and the failure recovery will be described.

When Failure Occurs

Figure 7:
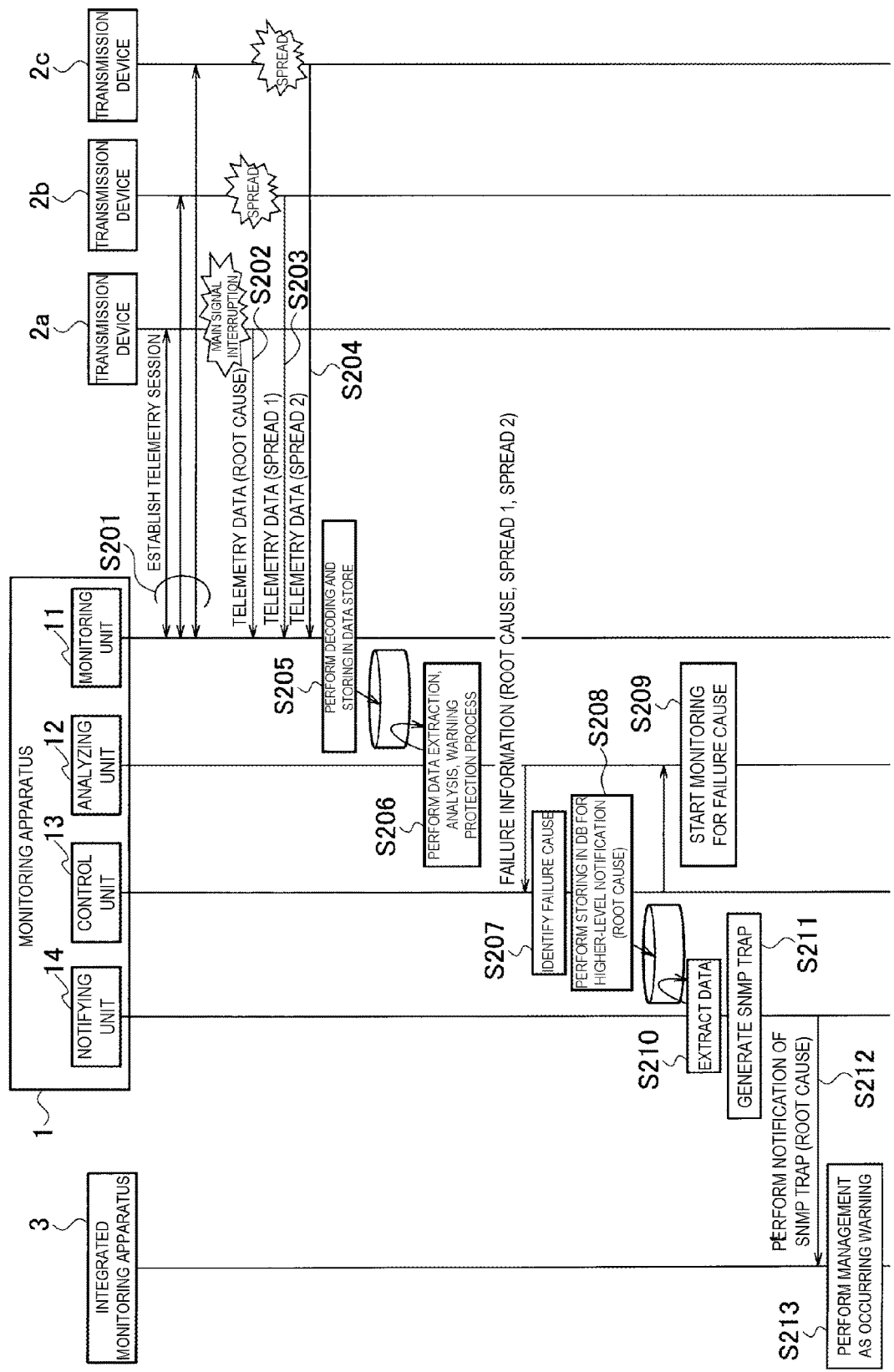
FIG. 7 is a diagram illustrating a processing sequence when a failure occurs.

Firstly, an operation when a failure occurs will be described. FIG. 7 is a diagram illustrating a processing sequence of the optical transmission system when a failure occurs.

Step S201:

Firstly, in the monitoring apparatus 1, the monitoring unit 11 establishes a telemetry session with each of the plurality of transmission devices 2.

Steps S202 to S205:

In a case where a main signal interruption failure occurs in the upstream transmission device 2a, the monitoring unit 11 receives warning information (failure occurrence information) of the root cause from the transmission device 2a. The monitoring unit 11 receives warning information (failure occurrence information) due to the spread of the failure from the downstream transmission devices 2b and 2c, and stores the warning information in the storage unit 15.

Step S206:

Then, the analyzing unit 12 extracts a plurality of pieces of warning information (failure occurrence information) from the storage unit 15 and checks whether the warning information from the plurality of transmission devices 2a to 2c has been continuously received for a predetermined warning protection time.

Steps S207 to S209:

In a case where the warning information (failure occurrence information) is continuously received for the predetermined warning protection time, the control unit 13 identifies the root cause by the correlation process and stores the root cause in the storage unit 15. The control unit notifies the analyzing unit 12 that only the root cause is set as the monitoring target. Then, the analyzing unit 12 sets only the root cause as the monitoring target and the determination target. This process corresponds to (Procedure 4).

Steps S210 to S212:

The notifying unit 14 extracts information of the root cause from the storage unit 15, generates warning information (SNMP TRAP) corresponding to the root cause, and notifies the integrated monitoring apparatus 3 of the warning information.

Step S213:

Finally, the integrated monitoring apparatus 3 manages the warning information (SNMP TRAP) notified from the monitoring apparatus 1, as occurring warning.

When Recovery is Performed from Failure

Figure 8:
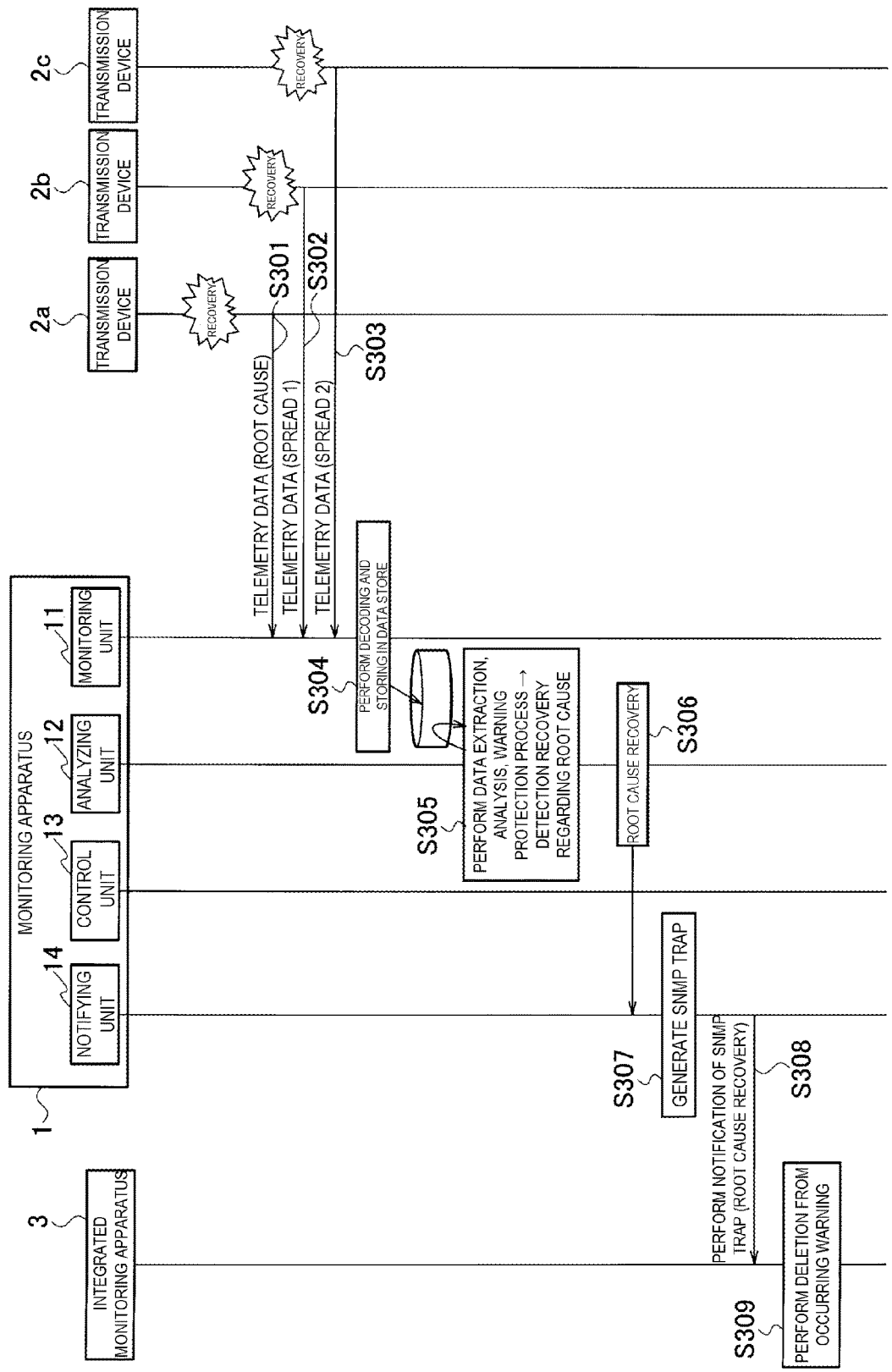
FIG. 8 is a diagram illustrating a processing sequence when recovery is performed from the failure.
Figure 9:
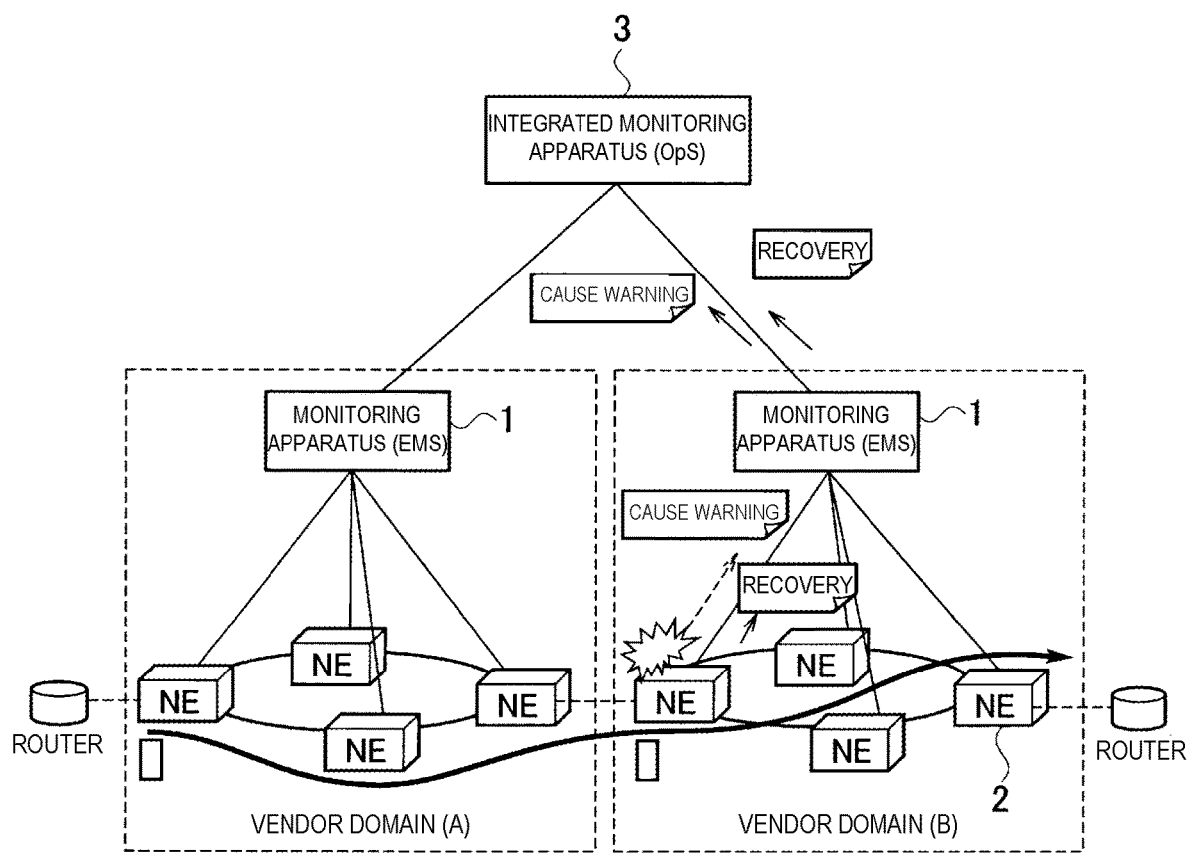
FIG. 9 is a diagram illustrating a known configuration of an optical transport network.
Figure 10A:
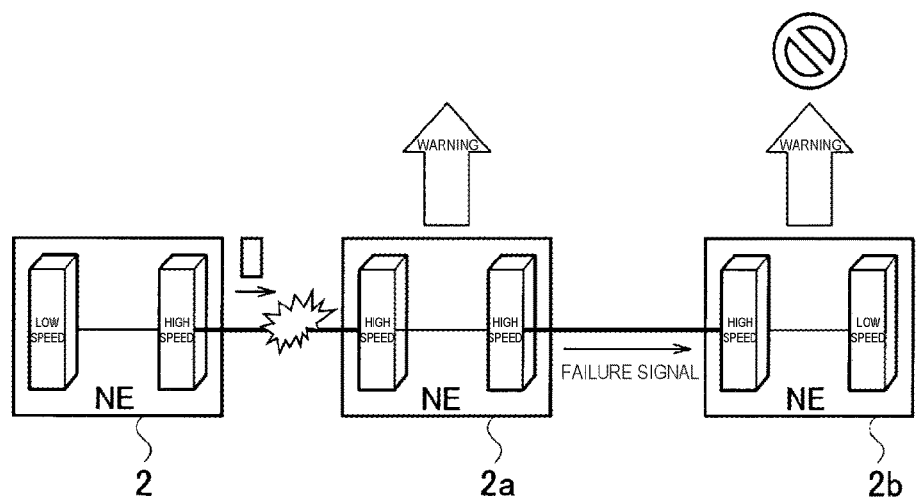
FIGS. 10A and 10B are diagrams illustrating a method of masking unnecessary warning information.
Figure 10B:
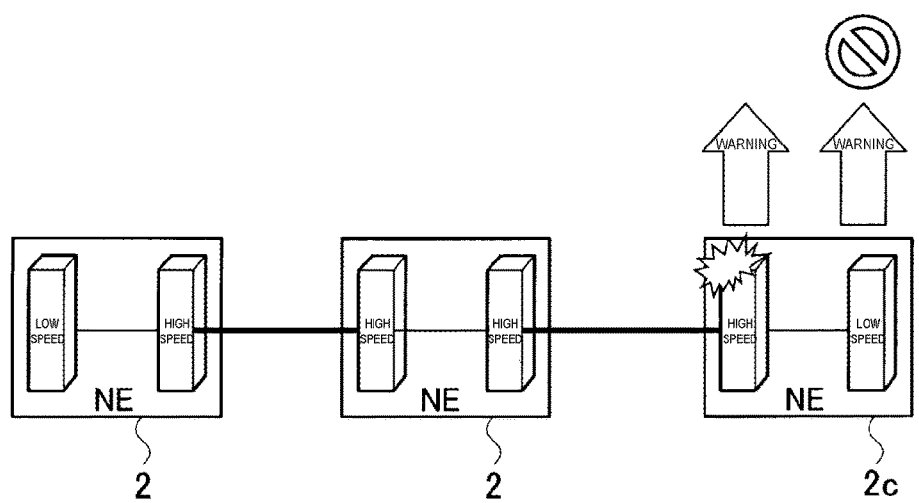
Figure 11:
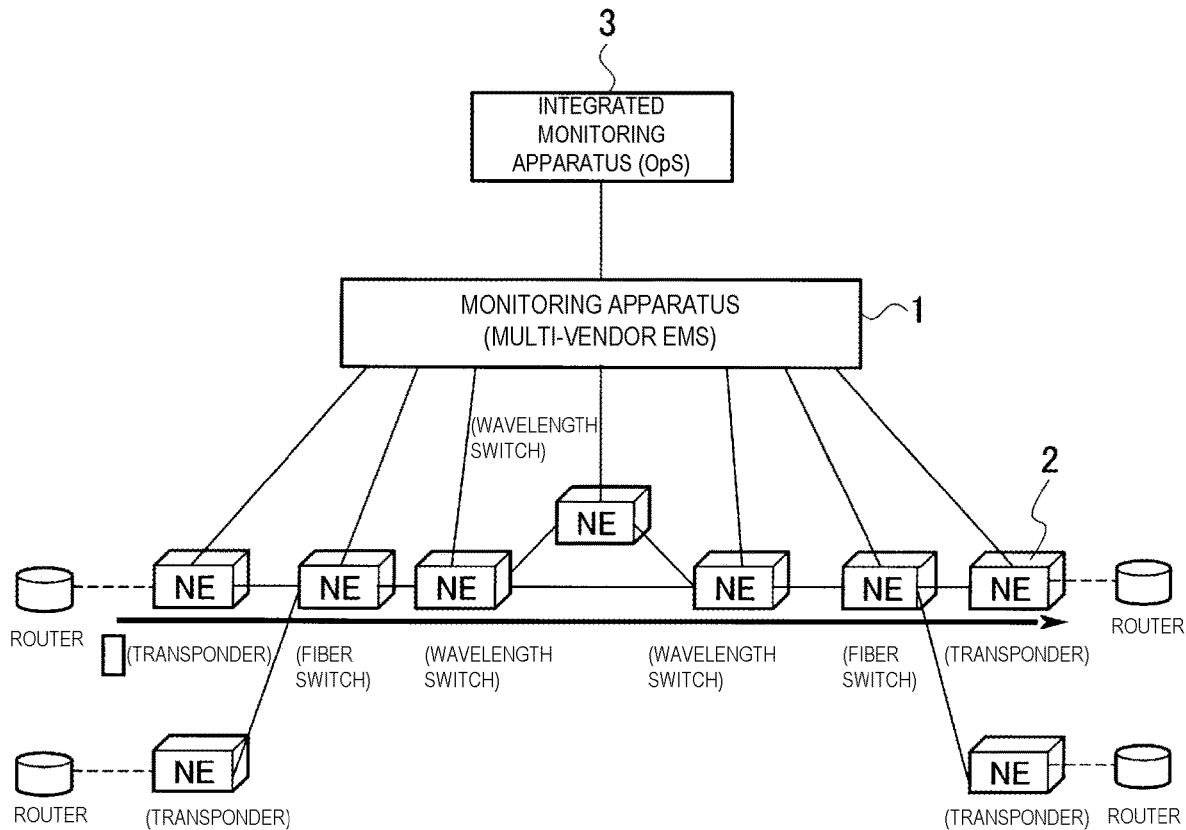
FIG. 11 is a diagram illustrating a disaggregation type connection configuration.
Figure 12A:
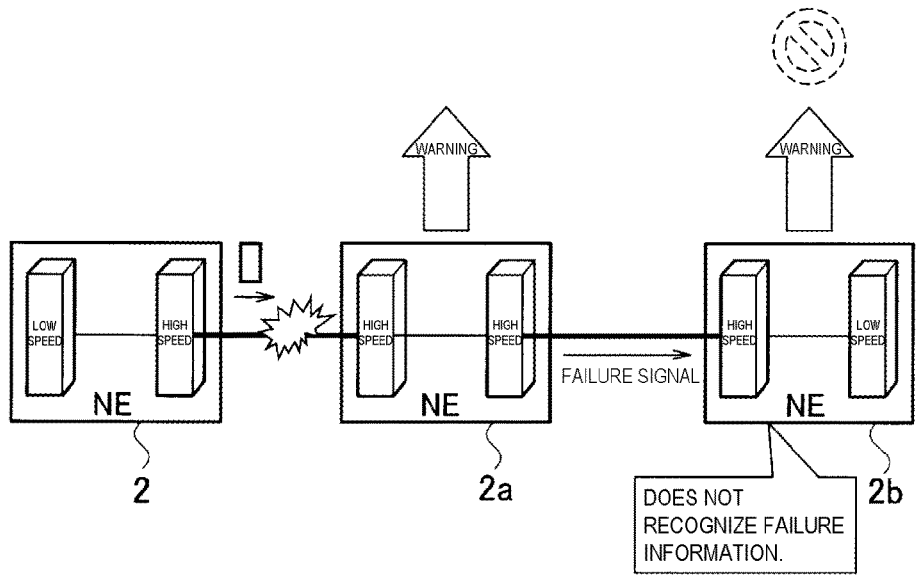
FIGS. 12A and 12B are diagrams illustrating a failure that occurs in the disaggregation type connection configuration.
Figure 12B:
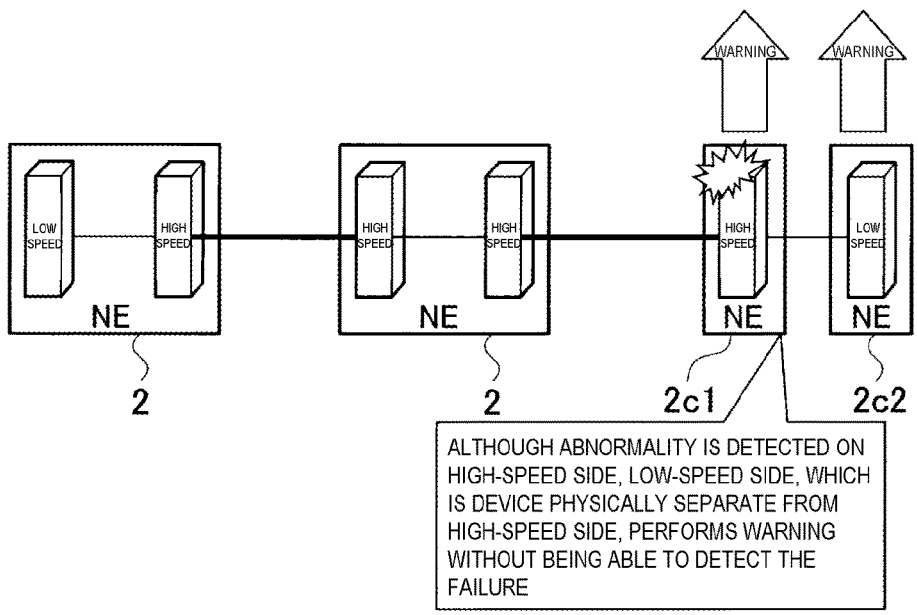
Figure 13:
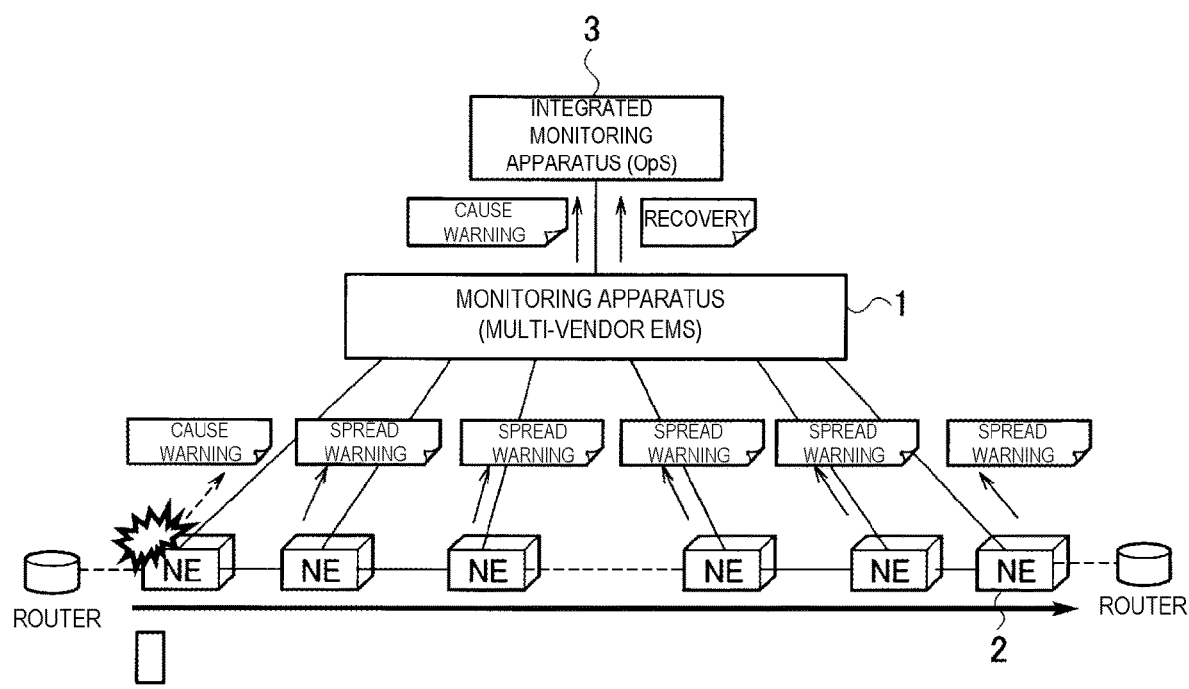
FIG. 13 is a diagram illustrating the disaggregation type connection configuration.
Figure 14A:
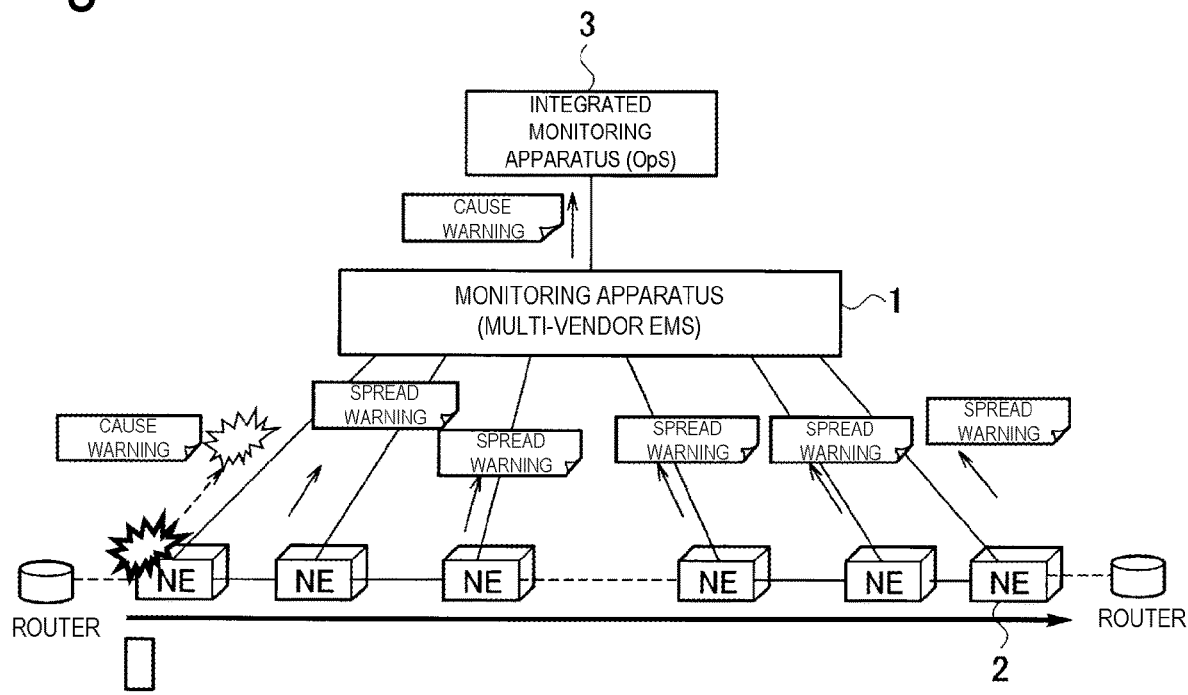
FIGS. 14A and 14B are diagrams illustrating Problem 1 that occurs in the disaggregation type connection configuration.
Figure 14B:
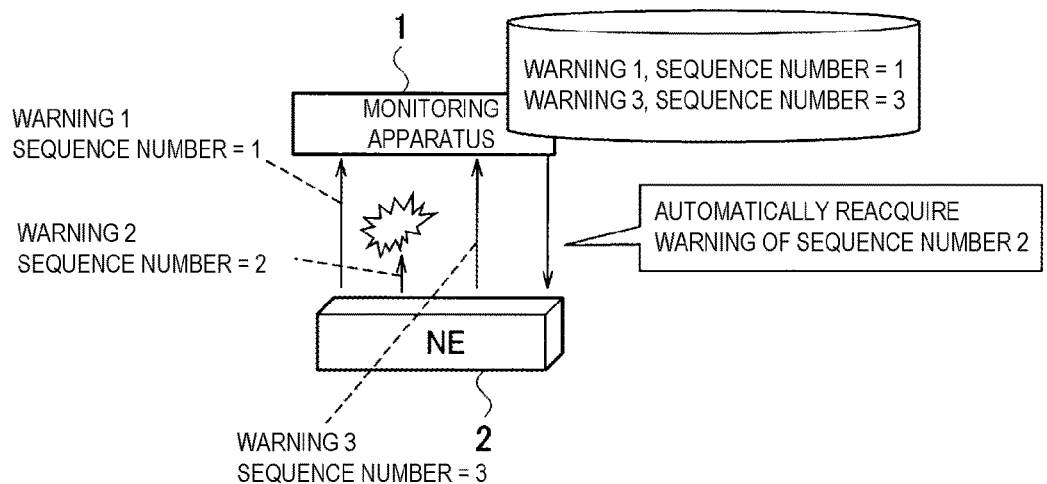
Figure 15:
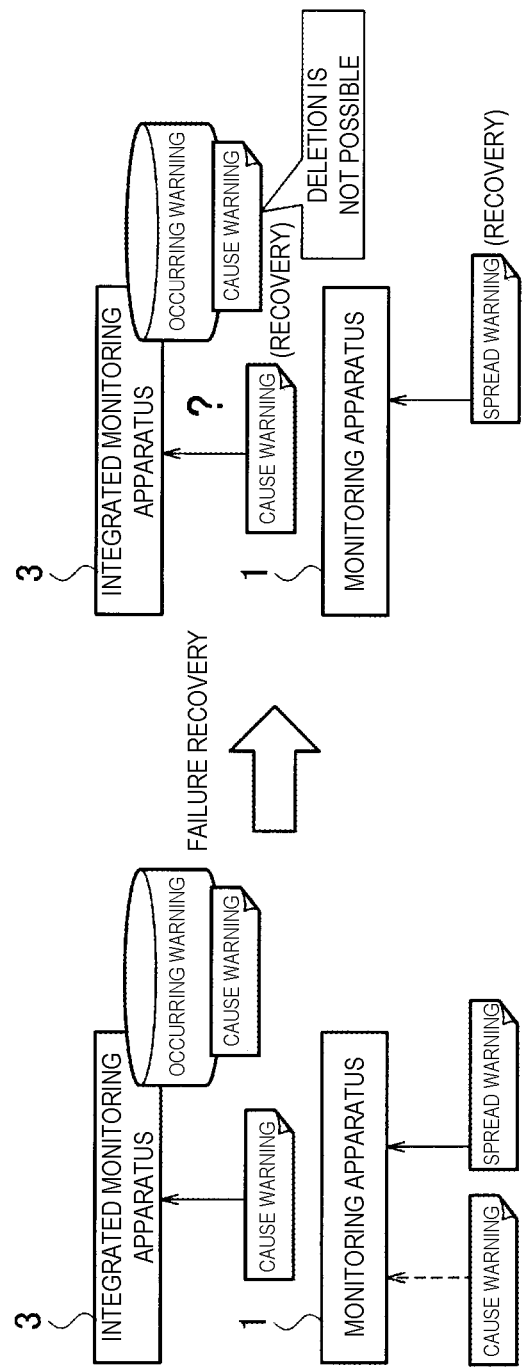
FIG. 15 is a diagram illustrating Problem 2 that occurs in the disaggregation type connection configuration.

Next, an operation when recovery is performed from the failure will be described. FIG. 8 is a diagram illustrating a processing sequence of the optical transmission system when recovery is performed from the failure.

Steps S301 to S304:

In a case where the upstream transmission device 2a recovers from the main signal interruption failure, the monitoring unit 11 in the monitoring apparatus 1 receives warning information (failure recovery information) of the root cause from the upstream transmission device 2a. The monitoring unit 11 receives warning information (failure recovery information) due to the spread of the recovery from the downstream transmission devices 2b and 2c, and stores the warning information in the storage unit 15.

Step S305:

Then, the analyzing unit 12 extracts a plurality of pieces of warning information (failure recovery information) from the storage unit 15 and checks whether the warning information from the plurality of transmission devices 2a to 2c has been continuously received for a predetermined warning protection time.

Step S306:

In a case where the warning information (failure recovery information) is continuously received for the predetermined warning protection time, the analyzing unit 12 determines whether the recovery is performed from the failure corresponding to the root cause of the monitoring target. In a case where the failure recovery corresponds to the root cause of the monitoring target, the notifying unit 14 is notified that the failure recovery corresponds to the root cause of the monitoring target.

Step S307:

The notifying unit 14 generates recovery information (SNMPTRAP) corresponding to the warning notified in Step S211, based on the notification of failure recovery from the analyzing unit 12. Then, the notifying unit 14 notifies the integrated monitoring apparatus 3 of the recovery information. Step S307 corresponds to (Procedure 5).

Step S309:

Finally, the integrated monitoring apparatus 3 deletes the occurring warning, which is managed in Step S212, based on the recovery information (SNMP TRAP) from the monitoring apparatus 1.

Effect

According to the embodiment, the monitoring apparatus 1 monitors whether a failure occurs and recovery is performed from the failure in the plurality of transmission devices 2. Thus, whether or not the warning information of a UDP is lost in the control communication path between the transmission device 2 and the monitoring apparatus 1, it is possible to reliably monitor whether a failure occurs and recovery is performed from the failure in the plurality of transmission devices 2, and to recognize an opportunity to notify the integrated monitoring apparatus 3 of the warning information (recovery). Thus, it is possible to solve (Problem 1) and (Problem 2).

According to the embodiment, in a case where a failure occurs and recovery is performed from the failure in the plurality of transmission devices 2, the monitoring apparatus 1 determines whether the failure occurrence or the failure recovery continues for a predetermined period. Only in a case where the failure occurrence continues for the predetermined period, the monitoring apparatus identifies the cause of the failure, using a plurality of pieces of warning information received from the plurality of transmission devices 2. Thus, it is possible to reliably monitor whether the failure occurs and recovery is performed from the failure in the plurality of transmission devices 2, even if the warning information is separately received from the plurality of transmission devices 2. Thus, it is possible to solve (Problem 3).

According to the embodiment, it is possible to appropriately monitor the transmission device.

Finally, the monitoring apparatus 1 described in the embodiment can be realized by a computer. It is also possible to create a program for causing a computer to function as the monitoring apparatus 1 and a storage medium for the program.

REFERENCE SIGNS LIST

1 Monitoring apparatus
11 Monitoring unit
12 Analyzing unit
13 Control unit
14 Notifying unit
15 Storage unit
2 Transmission device
3 Integrated monitoring apparatus

The invention claimed is:

1. A monitoring apparatus for monitoring a plurality of transmission devices having different specifications, the apparatus comprising:
    a monitoring unit configured to monitor whether a failure occurrence or failure recovery is present in the plurality of transmission devices;
    an analyzing unit configured to determine, in a case where a failure occurrence or failure recovery is present in the plurality of transmission devices, whether the failure occurrence or the failure recovery present in the plurality of transmission devices persists for a predetermined period;
    a control unit configured to identify, in a case where a failure occurrence present in the plurality of transmission devices is determined to persist for the predetermined period, a cause of the failure using a plurality of pieces of warning information received from the plurality of transmission devices; and
    a notifying unit configured to notify a higher-level monitoring apparatus of warning information corresponding to the cause of the failure and to notify the higher-level monitoring apparatus of recovery information in a case where failure recovery information corresponding to the cause of the failure is included in the plurality of pieces of warning information received from the plurality of transmission devices.

2. The monitoring apparatus according to claim 1, further comprising:
    a storage unit configured to store mask condition information, wherein the control unit is configured to use the mask condition information to identify, from among the plurality of pieces of warning information received from the plurality of transmission devices, warning information received from one or more transmission devices that is to be masked.

3. The monitoring apparatus according to claim 1, wherein each of one or more of the plurality of transmission devices is configured by at least two transmission modules, the monitoring apparatus further comprises a storage unit configured to store mask condition information, and the control unit is configured to use the mask condition information to identify, from among the plurality of pieces of warning information received from the plurality of transmission devices, warning information received from one or more transmission modules that is to be masked.

4. A monitoring method for monitoring a plurality of transmission devices having different specifications by a monitoring apparatus, the method comprising:

by the monitoring apparatus, monitoring whether a failure occurrence or failure recovery is present in the plurality of transmission devices;

determining, in a case where a failure occurrence or failure recovery is present in the plurality of transmission devices, whether the failure occurrence or the failure recovery present in the plurality of transmission devices persists for a predetermined period;

identifying, in a case where a failure occurrence present in the plurality of transmission devices is determined to persist for the predetermined period, a cause of the failure using a plurality of pieces of warning information received from the plurality of transmission devices;

notifying a higher-level monitoring apparatus of warning information corresponding to the cause of the failure; and notifying the higher-level monitoring apparatus of recovery information in a case where failure recovery information corresponding to the cause of the failure is included in the plurality of pieces of warning information received from the plurality of transmission devices.

5. The monitoring method according to claim 4, further comprising:

storing mask condition information;

using the mask condition information to identify, from among the plurality of pieces of warning information received from the plurality of transmission devices, warning information received from one or more transmission devices that is to be masked.

6. The monitoring method according to claim 4, wherein each of one or more of the plurality of transmission devices is configured by at least two transmission modules, and the monitoring method further comprises:

storing mask condition information;

using the mask condition information to identify, from among the plurality of pieces of warning information received from the plurality of transmission devices, warning information received from one or more transmission modules that is to be masked.

7. A non-transitory computer readable medium storing instructions that when executed by a computer cause a computer to perform a monitoring method for monitoring a plurality of transmission devices having different specifications, the monitoring method comprising:

monitoring whether a failure occurrence or failure recovery is present in the plurality of transmission devices;

determining, in a case where a failure occurrence or failure recovery is present in the plurality of transmission devices, whether the failure occurrence or the failure recovery present in the plurality of transmission devices persists for a predetermined period;

identifying, in a case where a failure occurrence present in the plurality of transmission devices is determined to persist for the predetermined period, a cause of the failure using a plurality of pieces of warning information received from the plurality of transmission devices;

notifying a higher-level monitoring apparatus of warning information corresponding to the cause of the failure; and notifying the higher-level monitoring apparatus of recovery information in a case where failure recovery information corresponding to the cause of the failure is included in the plurality of pieces of warning information received from the plurality of transmission devices.

8. The non-transitory computer readable medium according to claim 7, wherein the monitoring method further comprises:

storing mask condition information;

using the mask condition information to identify, from among the plurality of pieces of warning information received from the plurality of transmission devices, warning information received from one or more transmission devices that is to be masked.

9. The non-transitory computer readable medium according to claim 7, wherein each of one or more of the plurality of transmission devices is configured by at least two transmission modules, and the monitoring method further comprises:

storing mask condition information;

using the mask condition information to identify, from among the plurality of pieces of warning information received from the plurality of transmission devices, warning information received from one or more transmission modules that is to be masked.

* * * * *